(12) United States Patent
Tanaka et al.

(10) Patent No.: US 11,072,729 B2
(45) Date of Patent: Jul. 27, 2021

(54) SELF-ADSORBABLE FOAMED LAMINATE SHEET AND COMPOSITION FOR SELF-ADSORBABLE FOAMED SHEET

(71) Applicant: ZEON CORPORATION, Tokyo (JP)

(72) Inventors: Hidekazu Tanaka, Tokyo (JP); Atsushi Sone, Tokyo (JP); Osamu Kobayashi, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 76 days.

(21) Appl. No.: 16/486,156

(22) PCT Filed: Feb. 16, 2018

(86) PCT No.: PCT/JP2018/005575
§ 371 (c)(1),
(2) Date: Aug. 15, 2019

(87) PCT Pub. No.: WO2018/151274
PCT Pub. Date: Aug. 23, 2018

(65) Prior Publication Data
US 2019/0367780 A1    Dec. 5, 2019

(30) Foreign Application Priority Data

Feb. 20, 2017 (JP) ............................ JP2017-029010

(51) Int. Cl.
*C09J 7/38* (2018.01)
*B32B 5/18* (2006.01)

(52) U.S. Cl.
CPC ............... *C09J 7/385* (2018.01); *B32B 5/18* (2013.01); *C09J 2301/414* (2020.08); *C09J 2400/24* (2013.01); *C09J 2409/00* (2013.01); *C09J 2433/00* (2013.01)

(58) Field of Classification Search
CPC ...... B32B 5/18; C09J 7/385; C09J 7/20; C09J 133/06; C08J 9/30; C08J 2325/10; C08J 2333/06; C08J 2201/026; C08K 5/29
See application file for complete search history.

(56) References Cited

U.S. PATENT DOCUMENTS

| 3,142,654 A | * | 7/1964 | Peterson | .................. C08F 4/28 |
| | | | | 524/822 |
| RE27,366 E | * | 5/1972 | Edwin | ........................ C08J 9/30 |
| | | | | 521/65 |
| 2014/0147610 A1 | | 5/2014 | Traser et al. | |
| 2016/0304680 A1 | * | 10/2016 | Doi | .......................... C08J 9/365 |
| 2018/0056625 A1 | | 3/2018 | Ashida et al. | |

FOREIGN PATENT DOCUMENTS

| JP | 2003001741 A | 1/2003 |
| JP | 2006176693 A | 7/2006 |
| JP | 2014521775 A | 8/2014 |
| JP | 2016125060 A | 7/2016 |
| WO | 2016147679 A1 | 9/2016 |

OTHER PUBLICATIONS

Aug. 20, 2019, International Preliminary Report on Patentability issued in the International Patent Application No. PCT/JP2018/005575.
May 1, 2018, International Search Report issued in the International Patent Application No. PCT/JP2018/005575.
Nov. 24, 2020, the Extended European Search Report issued by the European Patent Office in the corresponding European Patent Application No. 18754218.8.

* cited by examiner

*Primary Examiner* — Hai Vo
(74) *Attorney, Agent, or Firm* — Kenja IP Law PC

(57) ABSTRACT

Provided are a self-adsorbable foamed laminate sheet having excellent weather resistance and causing no paste residue, and a composition for a self-adsorbable foamed sheet used to obtain the self-adsorbable foamed laminate sheet. A composition for a self-adsorbable foamed sheet comprises: a copolymer containing an unsaturated carboxylic acid monomer unit and having a solubility parameter (SP value) of 9.7 $(cal/cm^3)^{1/2}$ or less and a glass-transition temperature of $-10°$ C. or less; and a crosslinking agent.

6 Claims, 1 Drawing Sheet

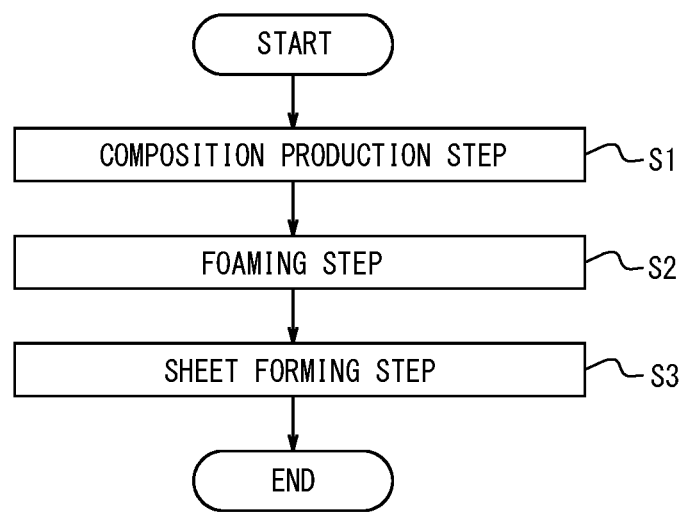

SELF-ADSORBABLE FOAMED LAMINATE SHEET AND COMPOSITION FOR SELF-ADSORBABLE FOAMED SHEET

TECHNICAL FIELD

The present disclosure relates to a self-adsorbable foamed laminate sheet and a composition for a self-adsorbable foamed sheet.

BACKGROUND

In recent years, self-adsorbable sheet members made of foamed material having many microscopic pores (hereinafter referred to as "self-adsorbable foamed sheets") are utilized as adsorbing sheets that are used by being stuck to smooth adsorbed bodies such as window glass. Because not pasted but adsorbing to adsorbed bodies using microscopic pores, self-adsorbable foamed sheets are easy to be restuck without any remaining paste, and are preferably employed in various uses such as building decorative material including interior decorative material such as wallpaper, and sticking material for advertising such as posters and stickers. For these uses, typically substrates such as resin films are stacked on self-adsorbable foamed sheets, and decorated by printing, etc. A laminate sheet having a foamed layer composed of a self-adsorbable foamed sheet (also referred to as "adsorption layer") and a support layer composed of a substrate is hereafter referred to as "self-adsorbable foamed laminate sheet".

Foamed resin is conventionally used for foamed material forming a self-adsorbable foamed sheet. As the resin of the foamed resin, (meth)acrylic acid ester copolymers are preferably used because they are excellent in various mechanical strengths.

Specifically, for example, PTL 1 discloses producing a self-adsorbable foamed sheet using a resin composition containing: a predetermined (meth)acrylic acid ester copolymer resin not having an N-methylol group in the molecule; and an oxazoline crosslinking agent. PTL 2 discloses producing a self-adsorbable foamed sheet using a resin composition containing: a predetermined (meth)acrylic acid ester copolymer resin; and a predetermined amount of carbodiimide crosslinking agent.

CITATION LIST

Patent Literatures

PTL 1: JP 2006-176693 A
PTL 2: WO 2016/147679 A1

SUMMARY

Technical Problem

However, the self-adsorbable foamed sheets in PTL 1 and PTL 2 are supposed to be used indoors, and are not subjected to any study to improve weather resistance so as to be usable outdoors. No self-adsorbable foamed laminate sheet having excellent weather resistance and usable outdoors has been achieved yet.

It could therefore be helpful to provide a self-adsorbable foamed laminate sheet having excellent weather resistance and causing no paste residue and a composition for a self-adsorbable foamed sheet used to obtain the self-adsorbable foamed laminate sheet.

Solution to Problem

To advantageously solve the problem stated above, a composition for a self-adsorbable foamed sheet according to the present disclosure comprises: a copolymer containing an unsaturated carboxylic acid monomer unit and having a solubility parameter (SP value) of 9.7 $(cal/cm^3)^{1/2}$ or less and a glass-transition temperature of $-10°$ C. or less; and a crosslinking agent. As a result of containing: a copolymer containing an unsaturated carboxylic acid monomer unit and having a solubility parameter (SP value) of 9.7 $(cal/cm^3)^{1/2}$ or less and a glass-transition temperature of $-10°$ C. or less; and a crosslinking agent, a self-adsorbable foamed laminate sheet having excellent weather resistance and causing no paste residue can be obtained.

The solubility parameter (SP value) of the copolymer can be calculated using Hoy's group contribution method.

Preferably, in the composition for a self-adsorbable foamed sheet according to the present disclosure, the crosslinking agent is a carbodiimide crosslinking agent. The use of a carbodiimide crosslinking agent as the crosslinking agent can further suppress paste residue.

Preferably, in the composition for a self-adsorbable foamed sheet according to the present disclosure, the copolymer further contains an alkenyl aromatic monomer unit, and a content of the alkenyl aromatic monomer unit in the copolymer is 1 mass % or more and 60 mass % or less. As a result of the copolymer further containing an alkenyl aromatic monomer unit and the content of the alkenyl aromatic monomer unit in the copolymer being 1 mass % or more and 60 mass % or less, the SP value of the copolymer can be decreased easily, and water intrusion can be prevented based on the hydrophobicity of the alkenyl aromatic monomer unit to improve weather resistance (in particular, water resistance).

Preferably, in the composition for a self-adsorbable foamed sheet according to the present disclosure, the copolymer further contains at least one of a (meth)acrylate monomer unit and a conjugated diene monomer unit. As a result of the copolymer further containing at least one of a (meth)acrylate monomer unit and a conjugated diene monomer unit, flexibility can be imparted to the self-adsorbable foamed sheet, and a self-adsorbable foamed laminate sheet excellent in close adherence to the adsorbed body can be obtained.

Preferably, in the composition for a self-adsorbable foamed sheet according to the present disclosure, the (meth)acrylate monomer unit is a (meth)acrylic acid alkyl ester monomer unit whose alkyl group has a carbon number of 1 or more and 14 or less, and a total content of the (meth)acrylate monomer unit and the conjugated diene monomer unit in the copolymer is 35 mass % or more and 99 mass % or less. As a result of the (meth)acrylate monomer unit being a (meth)acrylic acid alkyl ester monomer unit whose alkyl group has a carbon number of 1 or more and 14 or less and the total content of the (meth)acrylate monomer unit and the conjugated diene monomer unit in the copolymer being 35 mass % or more and 99 mass % or less, a self-adsorbable foamed laminate sheet sufficiently improved in close adherence to the adsorbed body while sufficiently suppressing paste residue can be obtained.

Preferably, in the composition for a self-adsorbable foamed sheet according to the present disclosure, a content of a (meth)acrylic acid alkyl ester monomer unit whose alkyl group has a carbon number of 4 or more and 14 or less in the copolymer is 35 mass % or more. As a result of the copolymer containing 35 mass % or more of a (meth)acrylic acid alkyl ester monomer unit whose alkyl group has a carbon number of 4 or more and 14 or less, a self-adsorbable foamed laminate sheet sufficiently improved in close adherence to the adsorbed body can be obtained.

Preferably, in the composition for a self-adsorbable foamed sheet according to the present disclosure, a content of the conjugated diene monomer unit in the copolymer is 30 mass % or more and 80 mass % or less.

As a result of the content of the conjugated diene monomer unit in the copolymer being 30 mass % or more and 80 mass % or less, a self-adsorbable foamed laminate sheet sufficiently improved in close adherence to the adsorbed body can be obtained.

Preferably, in the composition for a self-adsorbable foamed sheet according to the present disclosure, a content of the unsaturated carboxylic acid monomer unit in the copolymer is 0.1 mass % or more and 20 mass % or less. As a result of the content of the unsaturated carboxylic acid monomer unit in the copolymer being 0.1 mass % or more, crosslinking reaction can be promoted sufficiently, so that a decrease in foamed layer strength and paste residue on the adsorbed body can be prevented. As a result of the content of the unsaturated carboxylic acid monomer unit in the copolymer being 20 mass % or less, a self-adsorbable foamed laminate sheet sufficiently improved in close adherence to the adsorbed body can be obtained.

Preferably, in the composition for a self-adsorbable foamed sheet according to the present disclosure, a content of the crosslinking agent with respect to 100 parts by mass of the copolymer is 1 part by mass or more and 20 parts by mass or less. As a result of the content of the crosslinking agent being 1 part by mass or more with respect to 100 parts by mass of the copolymer, crosslinking reaction can be promoted sufficiently, so that a decrease in foamed layer strength and paste residue on the adsorbed body can be prevented. As a result of the content of the crosslinking agent being 20 parts by mass or less with respect to 100 parts by mass of the copolymer, a decrease in close adherence to the adsorbed body can be prevented.

Preferably, the composition for a self-adsorbable foamed sheet according to the present disclosure has a viscosity of 1000 mPa·s or more and 10000 mPa·s or less. As a result of the viscosity being 1000 mPa·s or more, a situation in which liquid dripping occurs when applying the composition for a self-adsorbable foamed sheet to a substrate to form a foamed layer and makes thickness control difficult can be prevented. As a result of the viscosity being 10000 mPa·s or less, a situation in which controlling the foaming ratio by mechanical foaming when forming a foamed layer is difficult can be prevented.

To advantageously solve the problem stated above, a self-adsorbable foamed laminate sheet according to the present disclosure comprises: a foamed layer composed of a self-adsorbable foamed sheet obtained by foaming and crosslinking the above-described composition for a self-adsorbable foamed sheet; and a support layer composed of a substrate. As a result of using the above-described composition for a self-adsorbable foamed sheet, a self-adsorbable foamed laminate sheet having excellent weather resistance and causing no paste residue can be obtained.

Preferably, in the self-adsorbable foamed laminate sheet according to the present disclosure, a density of the foamed layer is 0.1 g/cm³ or more and 1.0 g/cm³ or less. As a result of the density of the foamed layer being 0.1 g/cm³ or more, a decrease in foamed layer strength can be prevented. As a result of the density of the foamed layer being 1.0 g/cm³ or less, a decrease in air release property can be prevented, and paste residue can be sufficiently suppressed.

Preferably, in the self-adsorbable foamed laminate sheet according to the present disclosure, a thickness of the foamed layer is 0.03 mm or more and 3 mm or less. As a result of the thickness of the foamed layer being 0.03 mm or more, a decrease in mechanical strength can be prevented. As a result of the thickness of the foamed layer being 3 mm or less, a self-adsorbable foamed laminate sheet excellent in air release property and restickability (reworkability) can be obtained.

Herein, "(meth)acryl" is used to indicate "acryl and/or methacryl".

Herein, "(meth)acrylate" is used to indicate "acrylate and/or methacrylate".

Herein, the term "film" includes "sheet" and the term "sheet" includes "film".

Advantageous Effect

It is thus possible to obtain a self-adsorbable foamed laminate sheet having excellent weather resistance and causing no paste residue.

BRIEF DESCRIPTION OF THE DRAWINGS

In the accompanying drawings:

FIG. 1 is a flowchart illustrating an embodiment of a production method for a self-adsorbable foamed laminate sheet according to the present disclosure.

DETAILED DESCRIPTION

One of the disclosed embodiments will be described in detail below.

A composition for a self-adsorbable foamed sheet according to the present disclosure is suitable for use when obtaining a self-adsorbable foamed laminate sheet according to the present disclosure. The self-adsorbable foamed laminate sheet according to the present disclosure can be produced, for example, using the composition for a self-adsorbable foamed sheet according to the present disclosure.

(Composition for Self-Adsorbable Foamed Sheet)

The composition for a self-adsorbable foamed sheet according to the present disclosure contains a predetermined copolymer and a crosslinking agent, and optionally further contains other additives.

As a result of using the composition for a self-adsorbable foamed sheet according to the present disclosure, a self-adsorbable foamed laminate sheet having excellent weather resistance and causing no paste residue can be obtained.

<Copolymer>

The copolymer used in the composition for a self-adsorbable foamed sheet according to the present disclosure contains a predetermined monomer unit, and has a solubility parameter (SP value) of 9.7 (cal/cm³)$^{1/2}$ or less and a glass-transition temperature of −10° C. or less.

The solubility parameter (SP value) of the copolymer is not limited as long as it is 9.7 (cal/cm³)$^{1/2}$ (19.9 (MPa)) or less, but is preferably 9.6 (cal/cm³)$^{1/2}$ (19.7 (MPa)) or less, and more preferably 9.0 (cal/cm³)$^{1/2}$ (18.4 (MPa)) or less. As a result of the solubility parameter (SP value) of the copolymer being limited to the foregoing upper limit or less, a self-adsorbable foamed laminate sheet having appropriate self-adsorbing power and excellent weather resistance can be produced easily. If the SP value of the copolymer is excessively high, the water resistance of the foamed layer formed using the composition for a self-adsorbable foamed sheet decreases, so that the weather resistance of the self-adsorbable foamed laminate sheet cannot be improved sufficiently.

The SP value of the copolymer is typically 8.5 (cal/cm$^3$)$^{1/2}$ or more (17.4 (MPa)), without being limited thereto.

The solubility parameter (SP value) of the copolymer can be calculated using Hoy's group contribution method.

The glass-transition temperature of the copolymer is −10° C. or less, preferably −13° C. or less, more preferably −17° C. or less, and particularly preferably −25° C. or less. As a result of the glass-transition temperature of the copolymer being limited to the foregoing upper limit or less, the close adhesion rate to the adsorbed body is increased, and water is kept from coming between the adsorbed body and the foamed layer. Hence, a self-adsorbable foamed laminate sheet having excellent weather resistance can be produced easily. Although no lower limit is placed on the glass-transition temperature of the copolymer, the glass-transition temperature of the copolymer is preferably −40° C. or more in terms of suppressing paste residue on the adsorbed body.

For example, the glass-transition temperature of the copolymer can be measured as follows: A copolymer latex containing the copolymer is applied onto a polyethylene terephthalate film with an applicator, and dried at normal temperature to obtain a film. Using this film as a sample, the glass-transition temperature is measured in accordance with JIS K 7121 at a measurement temperature of −50° C. or more and 160° C. or less and a temperature increase rate of 10° C./min, using a differential scanning calorimeter (produced by Hitachi High-Tech Science Corporation, DSC7000X).

The copolymer can be blended in latex form, without being limited thereto. The solid content concentration of the copolymer latex containing the copolymer is not limited, but is preferably 40 mass % or more, more preferably 45 mass % or more, particularly preferably 50 mass % or more, and most preferably 52 mass % or more and 58 mass % or less.

If the solid content concentration of the copolymer latex is 40 mass % or more, the density of the foamed layer can be maintained even after the below-described sheet forming step.

[Monomer Unit]

The monomer unit includes an unsaturated carboxylic acid monomer unit, and optionally further includes an alkenyl aromatic monomer unit, a (meth)acrylate monomer unit, a conjugated diene monomer unit, and other monomer units.

The copolymer preferably does not contain an N-methylolacrylamide (NMA) unit, in terms of preventing the generation of formaldehyde.

—Unsaturated Carboxylic Acid Monomer Unit—

The unsaturated carboxylic acid monomer unit is a structural unit derived from an unsaturated carboxylic acid monomer.

Specific examples of the unsaturated carboxylic acid monomer include α,β-ethylenically unsaturated monocarboxylic acids such as acrylic acid, methacrylic acid, and crotonic acid; α,β-ethylenically unsaturated polyvalent carboxylic acids such as itaconic acid, maleic acid, and fumaric acid; and α,β-ethylenically unsaturated polyvalent carboxylic acid partial esters such as monomethyl itaconate, monobutyl maleate, and monopropyl fumarate. Monomers containing groups from which carboxyl groups can be derived by hydrolysis etc., such as maleic anhydride and itaconic anhydride, can be used as well. Of these, itaconic acid, acrylic acid, and methacrylic acid are preferable and itaconic acid is more preferable in terms of the reactivity with the crosslinking agent and the stability and cost of the latex.

These unsaturated carboxylic acid monomer units may be used alone or in combination of two or more thereof.

The content of the unsaturated carboxylic acid monomer unit in the copolymer is not limited, but is preferably 0.1 mass % or more and 20 mass % or less, more preferably 0.5 mass % or more and 10 mass % or less, further preferably 1 mass % or more and 5 mass % or less, and particularly preferably 1.5 mass % or more and 2.5 mass % or less.

If the content of the unsaturated carboxylic acid monomer unit in the copolymer is 0.1 mass % or more, crosslinking reaction can be promoted sufficiently, so that a decrease in foamed layer strength and paste residue on the adsorbed body can be prevented. If the content of the unsaturated carboxylic acid monomer unit in the copolymer is 20 mass % or less, the viscosity of the polymerization system in polymerization can be easily maintained in an appropriate range, and a loss of the self-adsorbability of the self-adsorbable foamed laminate sheet due to excessive progress of crosslinking of the copolymer can be easily prevented.

—Alkenyl Aromatic Monomer Unit—

The alkenyl aromatic monomer unit is a structural unit derived from an alkenyl aromatic monomer.

Specific examples of the alkenyl aromatic monomer include styrene, α-methylstyrene, α-chlorostyrene, vinyltoluene, and divinylbenzene. Of these, styrene is preferable in terms of polymerizability and cost.

These alkenyl aromatic monomer units may be used alone or in combination of two or more thereof.

The content of the alkenyl aromatic monomer unit in the copolymer is not limited, but is preferably 1 mass % or more and 60 mass % or less, more preferably 5 mass % or more and 55 mass % or less, further preferably 10 mass % or more and 55 mass % or less, and particularly preferably 14 mass % or more and 43 mass % or less. In the case where the copolymer further contains the alkenyl aromatic monomer unit, if the content of the alkenyl aromatic monomer unit in the copolymer is 1 mass % or more and 60 mass % or less, the SP value of the copolymer can be decreased easily, and water intrusion can be prevented based on the hydrophobicity of the alkenyl aromatic monomer unit to improve weather resistance (in particular, water resistance).

If the content of the alkenyl aromatic monomer unit in the copolymer is 5 mass % or more and 55 mass % or less, the SP value of the copolymer can be decreased more easily.

In the case where the copolymer further contains the alkenyl aromatic monomer unit, the SP value can be decreased easily and the weather resistance of the self-adsorbable foamed laminate sheet can be improved easily, but the hardness of the copolymer tends to be high. Even in such a case, for example, by containing at least one of the below-described (meth)acrylate monomer unit and conjugated diene monomer unit in the copolymer, an excessive increase of the hardness of the copolymer can be prevented, and a self-adsorbable foamed laminate sheet sufficiently improved in close adherence to the adsorbed body can be obtained.

—(Meth)Acrylate Monomer Unit—

The (meth)acrylate monomer unit is a structural unit derived from a (meth)acrylate monomer. As a result of the copolymer containing the (meth)acrylate monomer unit, flexibility can be imparted to the self-adsorbable foamed sheet, and a self-adsorbable foamed laminate sheet excellent in close adherence to the adsorbed body can be obtained.

The (meth)acrylate monomer is not limited. Examples include alkyl (meth)acrylates such as methyl (meth)acrylate, ethyl (meth)acrylate, n-propyl (meth)acrylate, n-butyl (meth)acrylate, sec-butyl (meth)acrylate, n-heptyl (meth) acrylate, n-hexyl (meth)acrylate, n-octyl (meth)acrylate, 2-ethylhexyl (meth)acrylate, and n-dodecyl (meth)acrylate; and alkoxyalkyl (meth)acrylates such as 2-methoxyethyl (meth)acrylate, 3-methoxypropyl (meth)acrylate, 3-methoxybutyl (meth)acrylate, and ethoxymethyl (meth) acrylate.

Of these, in terms of further improving the close adherence to the adsorbed body, the (meth)acrylate monomer is preferably a (meth)acrylic acid alkyl ester whose alkyl group has a carbon number of 1 or more and 14 or less. The (meth)acrylic acid alkyl ester whose alkyl group has a carbon number of 1 or more and 14 or less further preferably includes a (meth)acrylic acid alkyl ester whose alkyl group has a carbon number of 4 or more and 14 or less.

In the case where the (meth)acrylate monomer is a (meth) acrylic acid alkyl ester whose alkyl group has a carbon number of 1 or more and 14 or less, the content of the (meth)acrylic acid alkyl ester monomer unit derived from the (meth)acrylic acid alkyl ester in the copolymer is preferably 35 mass % or more and 99 mass % or less, more preferably 40 mass % or more and 95 mass % or less, and particularly preferably 45 mass % or more and 90 mass % or less. If the (meth)acrylate monomer is a (meth)acrylic acid alkyl ester whose alkyl group has a carbon number of 1 or more and 14 or less and the content of the (meth)acrylic acid alkyl ester monomer unit derived from the (meth) acrylic acid alkyl ester in the copolymer is 35 mass % or more and 99 mass % or less, a self-adsorbable foamed laminate sheet sufficiently improved in close adherence to the adsorbed body while sufficiently preventing paste residue can be obtained.

In the case where the (meth)acrylate monomer is a (meth) acrylic acid alkyl ester whose alkyl group has a carbon number of 1 or more and 14 or less and the copolymer contains both the (meth)acrylate monomer and the below-described conjugated diene monomer unit, the content of the (meth)acrylic acid alkyl ester monomer unit in the copolymer is preferably 1 mass % or more, more preferably 10 mass % or more, and particularly preferably 20 mass % or more.

In the case where the (meth)acrylate monomer is a (meth) acrylic acid alkyl ester whose alkyl group has a carbon number of 1 or more and 14 or less and the copolymer contains both the (meth)acrylate monomer and the below-described conjugated diene monomer unit, the total content of the (meth)acrylic acid alkyl ester monomer unit and the below-described conjugated diene monomer unit in the copolymer is preferably 35 mass % or more and 99 mass % or less, more preferably 40 mass % or more and 95 mass % or less, and particularly preferably 45 mass % or more and 90 mass % or less.

Specific examples of the (meth)acrylic acid alkyl ester whose alkyl group has a carbon number of 1 or more and 14 or less include methyl acrylate, ethyl acrylate, n-propyl acrylate, n-butyl acrylate, sec-butyl acrylate, n-heptyl acrylate, n-hexyl acrylate, n-octyl acrylate, 2-ethylhexyl acrylate, methyl methacrylate, ethyl methacrylate, n-propyl methacrylate, n-butyl methacrylate, n-octyl methacrylate, and n-dodecyl methacrylate.

In the case where the (meth)acrylate monomer contains a (meth)acrylic acid alkyl ester whose alkyl group has a carbon number of 4 or more and 14 or less, the content of the (meth)acrylic acid alkyl ester monomer unit whose alkyl group has a carbon number of 4 or more and 14 or less derived from the (meth)acrylic acid alkyl ester whose alkyl group has a carbon number of 4 or more and 14 or less in the copolymer is preferably 35 mass % or more, more preferably 40 mass % or more and 90 mass % or less, further preferably 45 mass % or more and 85 mass % or less, and particularly preferably 62 mass % or more and 70 mass % or less. If the (meth)acrylate monomer contains a (meth)acrylic acid alkyl ester whose alkyl group has a carbon number of 4 or more and 14 or less and the content of the (meth)acrylic acid alkyl ester monomer unit whose alkyl group has a carbon number of 4 or more and 14 or less in the copolymer is 35 mass % or more, a self-adsorbable foamed laminate sheet sufficiently improved in close adherence to the adsorbed body can be obtained. Consequently, water intrusion between the adsorbed body and the self-adsorbable foamed laminate sheet can be prevented to further improve the weather resistance of the self-adsorbable foamed laminate sheet. If the content of the (meth)acrylic acid alkyl ester monomer unit whose alkyl group has a carbon number of 4 or more and 14 or less is the foregoing upper limit or less, an excessive increase of the close adherence can be prevented, so that paste residue can be sufficiently suppressed.

In the case where the (meth)acrylate monomer contains a (meth)acrylic acid alkyl ester whose alkyl group has a carbon number of 4 or more and 14 or less and the copolymer contains both the (meth)acrylate monomer and the below-described conjugated diene monomer unit, the total content of the (meth)acrylic acid alkyl ester monomer unit and the below-described conjugated diene monomer unit in the copolymer is preferably 30 mass % or more, more preferably 35 mass % or more and 90 mass % or less, and further preferably 40 mass % or more and 85 mass % or less.

Specific examples of the (meth)acrylic acid alkyl ester whose alkyl group has a carbon number of 4 or more and 14 or less include n-butyl acrylate, sec-butyl acrylate, n-heptyl acrylate, n-hexyl acrylate, n-octyl acrylate, 2-ethylhexyl acrylate, n-butyl methacrylate, n-octyl methacrylate, and n-dodecyl methacrylate. Of these, n-butyl acrylate is preferable in terms of close adherence and cost.

These (meth)acrylate monomers may be used alone or in combination of two or more thereof.

—Conjugated Diene Monomer Unit—

The conjugated diene monomer unit is a structural unit derived from a conjugated diene monomer. As a result of the copolymer containing the conjugated diene monomer unit, flexibility can be imparted to the self-adsorbable foamed sheet, and a self-adsorbable foamed laminate sheet excellent in close adherence to the adsorbed body can be obtained.

Specific examples of the conjugated diene monomer include butadiene, isoprene, 1,3-pentadiene, and cyclopentadiene. Of these, butadiene is preferable in terms of weather resistance and cost.

The content of the conjugated diene monomer unit in the copolymer is not limited, but is preferably 30 mass % or more and 80 mass % or less, more preferably 35 mass % or more and 75 mass % or less, further preferably 40 mass % or more and 70 mass % or less, and particularly preferably 50 mass % or more and 56 mass % or less.

If the content of the conjugated diene monomer unit in the copolymer is 30 mass % or more and 80 mass % or less, a self-adsorbable foamed laminate sheet sufficiently improved in close adherence to the adsorbed body can be obtained. Consequently, water intrusion between the adsorbed body and the self-adsorbable foamed laminate sheet can be prevented to further improve the weather resistance of the self-adsorbable foamed laminate sheet. If the content of the conjugated diene monomer unit is the foregoing upper limit or less, an excessive increase of the close adherence can be prevented, so that paste residue can be sufficiently suppressed.

—Other Monomer Units—

The other monomer units are structural units derived from other monomers copolymerizable with the foregoing monomers.

The other monomers are not limited as long as the solubility parameter (SP value) of the copolymer is 9.7 $(cal/cm^3)^{1/2}$ or less and the glass-transition temperature of the copolymer is $-10°$ C. or less. Specific examples include $\alpha,\beta$-ethylenically unsaturated polyvalent carboxylic acid complete ester monomer, vinyl cyanide monomer, carboxylic acid unsaturated alcohol ester monomer, olefinic monomer, and other monomers containing functional groups. These monomers may be used alone or in combination of two or more thereof.

Specific examples of the $\alpha,\beta$-ethylenically unsaturated polyvalent carboxylic acid complete ester monomer include dimethyl fumarate, diethyl fumarate, dimethyl maleate, diethyl maleate, and dimethyl itaconate.

Specific examples of the vinyl cyanide monomer include acrylonitrile, methacrylonitrile, $\alpha$-chloroacrylonitrile, and $\alpha$-ethylacrylonitrile.

Specific examples of the carboxylic acid unsaturated alcohol ester monomer include vinyl acetate.

Specific examples of the olefinic monomer include ethylene, propylene, butene, and pentene.

As the other monomers, a monomer containing a functional group may be used for the purpose of efficient crosslinking inside or between copolymers Examples of the functional group mentioned herein include an organic acid group other than a carboxyl group, a hydroxyl group, an amino group, an amide group, a mercapto group, and an epoxy group.

A monomer containing the organic acid group is not limited. A typical example is a monomer containing an organic acid group such as a sulfonic acid group. Monomers containing a sulfenic acid group, a sulfinic acid group, a phosphoric acid group, etc. can also be used.

Specific examples of the monomer containing the sulfonic acid group include $\alpha,\beta$-unsaturated sulfonic acids such as allylsulfonic acid, methallylsulfonic acid, vinylsulfonic acid, and acrylamido-2-methylpropane sulfonic acid; and salts thereof.

In the case of using the monomer containing the organic acid group, the content of the monomer unit derived from the monomer containing the organic acid group in the copolymer is preferably 0.1 mass % or more and 10 mass % or less, and more preferably 0.5 mass % or more and 5 mass % or less. If the content of the monomer unit derived from the monomer containing the organic acid group in the copolymer is in the foregoing range, the viscosity of the polymerization system in polymerization can be easily maintained in an appropriate range, and a loss of the self-adsorbability of the self-adsorbable foamed laminate sheet due to excessive progress of crosslinking of the copolymer can be easily prevented.

An easy and preferable way of introducing the monomer containing the organic acid group unit into the copolymer is the polymerization of the monomer containing the organic acid group. Alternatively, the organic acid group may be introduced by a known polymer reaction after the formation of the copolymer.

In the case of using a monomer containing a functional group (hydroxyl group, amino group, amide group, epoxy group) other than the organic acid group, the content of the monomer unit derived from the monomer of the functional group other than the organic acid group in the copolymer is preferably 10 mass % or less. If the content of the monomer unit derived from the monomer of the functional group other than the organic acid group in the copolymer is 10 mass % or less, the viscosity of the polymerization system in polymerization can be easily maintained in an appropriate range, and a loss of the self-adsorbability of the self-adsorbable foamed laminate sheet due to excessive progress of crosslinking of the copolymer can be easily prevented As the other monomers, a multifunctional monomer having a plurality of polymerizable unsaturated bonds may also be used. The multifunctional monomer preferably has the unsaturated bonds at its terminal. Using such a multifunctional monomer makes it possible to introduce intramolecular and/or intermolecular crosslinking into the copolymer.

Examples of the multifunctional monomer include bifunctional monomers such as divinylbenzene, ethylene diacrylate, ethylene dimethacrylate, and allyl methacrylate; and trifunctional monomers such as trimethylolpropane trimethacrylate. These multifunctional monomers may be used alone or in combination of two or more thereof.

The polymerization method when obtaining the copolymer is not limited, and may be any of solution polymerization, emulsion polymerization, suspension polymerization, and bulk polymerization, or any method other than these. The types and amounts of the polymerization initiator, emulsifier, dispersant, etc. used for polymerization are not limited as well. The methods of adding the monomers, the polymerization initiator, the emulsifier, the dispersant, etc. in polymerization are not limited as well. The polymerization temperature and pressure, the stirring conditions, and the like are not limited as well.

The copolymer is in a solid state. The use of a latex obtained by emulsion polymerization or a latex obtained by subjecting a polymer to post-emulsion eases operation in mixing with the crosslinking agent, and is also convenient in foaming a composition prepared using the obtained latex.

<Crosslinking Agent>

The crosslinking agent used in the present disclosure is not limited, and may be a crosslinking agent that forms a crosslinked structure with the unsaturated carboxylic acid monomer unit. Examples include carbodiimide crosslinking agents; oxazoline crosslinking agents; multifunctional isocyanate crosslinking agents such as tolylene diisocyanate, trimethylolpropane tolylene diisocyanate, and diphenylmethane triisocyanate; metal salt-based crosslinking agents; metal chelate-based crosslinking agents; and peroxide-based crosslinking agents. Of these, carbodiimide crosslinking agents are preferable, and a compound having two or more carbodiimide groups in one molecule is particularly preferable. A known carbodiimide compound can be used as such a compound.

It is preferable not to use a crosslinking agent that causes formaldehyde, such as melamine-formaldehyde resin, urea-formaldehyde resins, and phenolformaldehyde resin.

A synthesized or commercially available carbodiimide compound may be used as the known carbodiimide compound. Examples of the commercially available carbodiimide compound include "DICNAL HX" produced by DIC Corporation, and "CARBODILITE" produced by Nisshinbo Chemical Inc. In the case of synthesizing a carbodiimide compound, for example, a polycarbodiimide compound resulting from carbodiimidization of polyisocyanate by decarboxylative condensation reaction in the presence of a carbodiimidization catalyst can be used.

The carbodiimide crosslinking agent forms an intramolecular or intermolecular crosslinked structure in the copolymer by reaction of the carbodiimide group in the carbodiimide crosslinking agent and the unsaturated carboxylic acid monomer unit in the copolymer. The carbodiimide crosslinking agent is preferable because it has excellent crosslinking effect especially at low temperature and enables obtainment of a self-adsorbable foamed laminate sheet in which a self-adsorbable foamed sheet having appropriate self-adsorbing power and excellent strength after crosslinking is formed.

The amount of the crosslinking agent used in terms of solid content with respect to 100 parts by mass of the copolymer is preferably 0.5 parts by mass or more and 20 parts by mass or less, more preferably 1 part by mass or more and 20 parts by mass or less, and particularly preferably 2 parts by mass or more and 10 parts by mass or less. If the amount of the crosslinking agent used is in the foregoing range, appropriate foamed layer strength and elasticity can be maintained to prevent a decrease in close adherence to the adsorbed body, and paste residue on the adsorbed body can be prevented.

The composition for a self-adsorbable foamed sheet according to the present disclosure may optionally contain various additives in order to improve processability in the production of the self-adsorbable foamed laminate sheet or improve the performance of the resultant self-adsorbable foamed laminate sheet.

Examples of such additives include foam stabilizers, auxiliary foaming agents, thickeners, fillers, antiseptics, fungicides, gelatinizers, flame retardants, anti-aging agents, antioxidants, pigments, dyes, tackifiers, conductive compounds, water-resisting agents, and oil-resisting agents.

As these additives, for example, those described in PTL 2 may be used, without being limited thereto.

(Self-Adsorbable Foamed Laminate Sheet)

The self-adsorbable foamed laminate sheet according to the present disclosure includes: a foamed layer composed of a self-adsorbable foamed sheet obtained by foaming and crosslinking the composition for a self-adsorbable foamed sheet according to the present disclosure; and a support layer composed of a substrate.

The foamed layer may be formed directly on the support layer, or an optional layer may be interposed between the foamed layer and the support layer.

<Foamed Layer> the density of the foamed layer is not limited, but is preferably 0.1 g/cm$^3$ or more and 1.0 g/cm$^3$ or less, more preferably 0.3 g/cm$^3$ or more and 0.8 g/cm$^3$ or less, and further preferably 0.5 g/cm$^3$ or more and 0.7 g/cm$^3$ or less.

If the density of the foamed layer is 0.1 g/cm$^3$ or more, a decrease in foamed layer strength can be prevented. If the density of the foamed layer is 1.0 g/cm$^3$ or less, a decrease in air release property can be prevented, and paste residue can be sufficiently suppressed.

The density of the foamed layer can be determined by measuring the mass of the foamed layer per unit volume.

<Substrate>

Specific examples of the substrate used in the self-adsorbable foamed laminate sheet according to the present disclosure include paper substrates, synthetic paper, and plastic sheets.

The thickness of the support layer composed of the substrate is not limited, but is typically 10 μm or more and 200 μm or less.

By using a detachable substrate, it is possible to form an adsorption layer composed of the self-adsorbable foamed sheet on the substrate and then detach the substrate to allow for use as a self-adsorbable foamed sheet as described later.

[Paper Substrate]

Examples of the paper substrates include woodfree paper, art paper, coated paper, kraft paper, and laminated paper obtained by laminating a thermoplastic resin such as polyethylene on these paper substrates.

[Synthetic Paper]

The synthetic paper is obtained by combining a thermoplastic resin with an inorganic filler to form its outermost layer into paper, without being limited thereto.

[Plastic Sheet]

Examples of the plastic sheets include sheets made of polyester resins such as polyethylene terephthalate and polyethylene naphthalate; polystyrene resins; polyvinyl chloride resins; acrylic resins; polycarbonate resins; polyamide resins; fluorine-based resins such as polytetrafluoroethylene; and mixtures or laminates thereof.

<Production Method for Self-Adsorbable Foamed Laminate Sheet>

A production method for the self-adsorbable foamed laminate sheet according to the present disclosure will be described below.

FIG. 1 is a flowchart illustrating a production method S10 for the self-adsorbable foamed sheet in the self-adsorbable foamed laminate sheet according to the present disclosure (hereafter also abbreviated as "production method S10"). As illustrated in FIG. 1, the production method S10 includes a composition production step S1, a foaming step S2, and a sheet forming step S3 in this order. Each of the steps will be described below.

[Composition Production Step S1]

The composition production step S1 is a step of producing a composition for a self-adsorbable foamed sheet containing: a copolymer containing an unsaturated carboxylic acid monomer unit and having a solubility parameter (SP value) of 9.7 (cal/cm$^3$)$^{1/2}$ or less and a glass-transition temperature of −10° C. or less; and a crosslinking agent.

In the composition production step S1, the composition for a self-adsorbable foamed sheet can be produced by mixing the predetermined copolymer and the crosslinking agent, which are essential components, and other components optionally used by any method. Each substance used in this step, the proportion of the substance used, etc. are as described above, and thus their description is omitted here.

In the case of using a latex containing the copolymer, mixing can be easily performed by simply adding the crosslinking agent and the other components to the latex in a state of a water dispersion, a water solution, or the like while stirring.

In the case of using the copolymer in a solid state, too, the mixing method is not limited. For example, mixing may be performed using a roll, a Henschel mixer, a kneader, or the like. Batch mixing or continuous mixing may be performed.

Examples of batch mixers include kneaders and stirrers for high viscosity materials such as grinding machines, kneaders, internal mixers, and planetary mixers. Examples of continuous mixers include Farrel continuous mixers that are combinations of rotors and screws, and kneaders of special structures like screw type kneaders. Single-screw extruders and twin-screw extruders that are used for extruding are included. These extruders and kneaders may be used in combination of two or more thereof, or a plurality of machines of the same type may be coupled and used.

The form of the composition for a self-adsorbable foamed sheet according to the present disclosure is not limited.

Emulsion or dispersion form is advantageous in obtaining a self-adsorbable foamed sheet.

The viscosity of the composition for a self-adsorbable foamed sheet in emulsion or dispersion form is preferably 1,000 mPa·s or more and 10,000 mPa·s or less, more preferably 2,000 mPa·s or more and 10,000 mPa·s or less, and more preferably 3,500 mPa·s or more and 5,500 mPa·s or less.

As a result of the viscosity of the composition for a self-adsorbable foamed sheet being 1,000 mPa·s or more, a situation in which liquid dripping occurs when applying the composition for a self-adsorbable foamed sheet to the substrate to form the foamed layer and makes thickness control difficult can be prevented. As a result of the viscosity being 10,000 mPa·s or less, a situation in which controlling the foaming ratio by mechanical foaming when forming the foamed layer is difficult can be prevented.

The viscosity of the composition for a self-adsorbable foamed sheet can be measured by a B-type viscometer (produced by RION Co., Ltd., VISCOTESTER VT-06) at 23° C.

[Foaming Step S2]

The foaming step S2 is a step of foaming the composition for a self-adsorbable foamed sheet to obtain a foam of the composition for a self-adsorbable foamed sheet.

In the foaming step S2, a foam in an unsolidified (uncrosslinked) state can be obtained by foaming the composition for a self-adsorbable foamed sheet produced in the composition production step S1. In the case where the composition for a self-adsorbable foamed sheet is an emulsion or dispersion form, a foamed emulsion or a foamed dispersion is obtained.

As the foaming method, mechanical foaming is typically employed. The foaming ratio is adjusted as appropriate, and is typically 1.2 times or more and 5 times or less and preferably 1.5 times or more and 4 times or less. The method of mechanical foaming is not limited. For example, mechanical foaming can be carried out by mixing a certain amount of air in an emulsion or dispersion of the composition for a self-adsorbable foamed sheet and stirring the mixture in continuous or batch mode using an Oakes mixer, a whipper, or the like. The resultant foamed emulsion or foamed dispersion is creamy.

By forming fine pores through mechanical foaming, a self-adsorbable foamed sheet excellent in air release property can be obtained. As a result of the foaming ratio being 1.2 times or more, a decrease in air release property can be prevented. As a result of the foaming ratio being 5 times or less, a decrease in foamed layer strength can be prevented.

[Sheet Forming Step S3]

The sheet forming step S3 is a step of shaping the foam into a sheet and then causing crosslinking reaction of the copolymer. For example, thermal crosslinking is promoted through a coater such as the below-described roll coater, thus obtaining a self-adsorbable foamed sheet having appropriate flexibility adhesion performance.

In the sheet forming step S3, the method of shaping the foam into a sheet is not limited. For example, a preferred method is to coat, with the foam, process paper such as a polyester film subjected to releasing treatment to shape the foam into a sheet.

The method of coating the process paper with the foam may use a commonly known coating device such as a roll coater, a reverse roll coater, a screen coater, a doctor knife coater, or a comma knife coaters. In particular, the use of a doctor knife coater achieves uniform coating thickness.

After shaping the foam into a sheet in this way, the copolymer is subjected to crosslinking reaction, as a result of which a self-adsorbable foamed sheet obtained by solidifying the sheet foam can be formed on the process paper. If detachable process paper is used, the self-adsorbable foamed sheet can be easily separated from the process paper.

In the case of producing the self-adsorbable foamed sheet, the foregoing substrate is used as the process paper, so that the self-adsorbable foamed sheet can be formed on the substrate in the sheet forming step S3. Thus, the self-adsorbable foamed laminate sheet including the foamed layer composed of the self-adsorbable foamed sheet and the support layer composed of the substrate can be produced.

In the sheet forming step S3, when performing the crosslinking reaction of the copolymer, the foam is preferably heat-dried. The heat-drying method is not limited as long as the foamed emulsion or foamed dispersion applied onto the process paper can be dried and crosslinked. A typical hot air circulation-type oven, hot oil circulation-type hot air chamber, far-infrared heater chamber, or the like may be used. An appropriate drying temperature is 60° C. or more and 180° C. or less. The drying conditions can be selected as appropriate depending on the properties of the emulsion or dispersion, the coating amount, the coating thickness, and the like. Preferably, multi-stage drying is carried out in such a manner that the foam is initially dried from the inside at lower temperature and later dried sufficiently at higher temperature, instead of drying at constant temperature.

The density, thickness, hardness, and the like of the obtained self-adsorbable foamed sheet are adjusted according to the mixing ratio of air bubbles, the composition for a self-adsorbable foamed sheet, the solid content concentration, the heat-drying solidification conditions, etc. The thickness of the self-adsorbable foamed sheet (i.e. foamed layer) is preferably 0.03 mm or more and 3 mm or less, more preferably 0.05 mm or more and 1 mm or less, and particularly preferably 0.05 mm or more and 0.5 mm or less. Most preferably, the thickness after the drying is about 0.15 mm (150 μm) (e.g. 100 μm or more and 200 μm or less). As a result of the thickness of the foamed layer being 0.03 mm or more, a decrease in mechanical strength can be prevented. As a result of the thickness of the foamed layer being 3 mm or less, a self-adsorbable foamed laminate sheet excellent in air release property and restickability (reworkability) can be obtained.

A separator film is typically stuck on the self-adsorbable surface of the self-adsorbable foamed sheet or the self-adsorbable foamed laminate sheet obtained as a result of the sheet forming step S3, and then the self-adsorbable foamed sheet or the self-adsorbable foamed laminate sheet is wound up by a winder and cut by press cutting, with a slitter, etc., to be processed to a usable size.

<Uses of Self-Adsorbable Foamed Laminate Sheet>

The substrate surface of the self-adsorbable foamed laminate sheet according to the present disclosure can be printed by, for example, offset printing, seal printing, flexographic printing, silkscreening, gravure printing, or printing with a laser printer, a thermal transfer printer, an ink jet printer, or the like.

The self-adsorbable foamed laminate sheet printed on its substrate surface can be used outdoors. Examples of the uses include cards for sales promotion, POP cards (posters, stickers, and displays), POPs for gardening (plant labels), road signs (for funeral and/or housing exhibition locations), and display boards (displaying "no entry", operation on forestry roads, etc.).

As a result of the resin composition for a self-adsorbable foamed sheet being set appropriately, the self-adsorbable foamed laminate sheet according to the present disclosure emits only a very slight amount of formaldehyde, if any. The amount of formaldehyde generated can be limited to less than a detection limit (e.g. less than 0.1 ppm).

EXAMPLES

The following will provide more specific description of the present disclosure based on examples, although the present disclosure is not limited to the following examples. Herein, "parts" and "%" are by mass, unless otherwise specified.

[Material Properties]

<Calculation of Solubility Parameter (SP Value) of Copolymer>

The solubility parameter (SP value) of the copolymer was calculated using Hoy's group contribution method. The results are listed in Table 1.

<Measurement of Glass-Transition Temperature (Tg) of Copolymer>

The glass-transition temperature (Tg) of the copolymer used as material of the below-described self-adsorbable foamed laminate sheet was measured by the following method: A copolymer latex containing the copolymer was applied onto a polyethylene terephthalate film of 50 μm in thickness with a 250 μm applicator, and dried at normal temperature for 24 hr to obtain a film formed on the polyethylene terephthalate film. Using the film (other than the polyethylene terephthalate film) formed on the polyethylene terephthalate film as a sample, the glass transition temperature (° C.) was measured in accordance with JIS K 7121 at a measurement temperature of −50° C. or more and 160° C. or less and a temperature increase rate of 10° C./min, using a differential scanning calorimeter (produced by Hitachi High-Tech Science Corporation, DSC7000X). The results are shown in Table 1.

<Measurement of Viscosity of Composition for a Self-Adsorbable Foamed Sheet>

The viscosity of the composition for a self-adsorbable foamed sheet was measured using a B-type viscometer (produced by RION Co., Ltd., VISCOTESTER VT-06) at 23° C. The results are listed in Table 1.

[Evaluation Items]

<Self-Adsorbing Power (Initial Value)>

After the self-adsorbable foamed laminate sheet was produced, a test piece cut out into a size of 125 mm×25 mm was prepared. The adsorption surface of the test piece was stuck onto a glass sheet with a smooth surface. The test piece was pressure-bonded with a 2 kgf load roller from above, and left in an environment of 23° C. and 50% RH for 1 hr. After this, an end of the test piece was fixed to an upper chuck of an autograph (produced by Shimadzu Corporation, AG-IS), the glass sheet was fixed to a lower chuck of the autograph, and a 180° peeling test was carried out at a rate of 300 mm/min in an environment of 23° C. and 50% RH. The test strength at the time was taken to be initial self-adsorbing power (N/cm).

<Weathering Acceleration Test (Self-Adsorbing Power (after Weathering Acceleration))>

After the self-adsorbable foamed laminate sheet was produced, a test piece cut out into a size of 125 mm×25 mm was prepared. The adsorption surface of the test piece was stuck onto a glass sheet with a smooth surface. The test piece was pressure-bonded with a 2 kgf load roller from above. The glass sheet onto which the test piece was stuck was then attached to a test piece holder. While spraying water (simulated rainfall) onto the test piece surface, the test piece was irradiated with light by Sunshine Super Long-life Weather Meter (produced by Suga Test Instrument Co., Ltd., WEL-SUN-HC•B type) having a sunshine carbon arc (ultra long-life carbon 4 pairs) with a discharge voltage of 50 V and a discharge current of 60 A, to perform weathering acceleration treatment for 500 hr at a black panel temperature of 63° C. The surface spray (simulated rainfall) time was 18 min/2 hr. The test piece that had undergone the weathering acceleration treatment was left for 1 day in an environment of 23° C. and 50% RH, in a state of being stuck onto the glass sheet. After this, an end of the test piece was fixed to an upper chuck of an autograph (produced by Shimadzu Corporation, AG-IS), the glass sheet was fixed to a lower chuck of the autograph, and a 180° peeling test was carried out at a rate of 300 mm/min in an environment of 23° C. and 50% RH. The test strength at the time was taken to be self-adsorbing power after weathering acceleration (N/cm).

<Close Adhesion Rate (after Acceleration)>

An image was captured from the back side of the surface to which the test piece that had undergone the weathering acceleration test (self-adsorbing power (after weathering acceleration)) was stuck. The image was captured using a color composite machine (produced by Fuji Xerox Co., Ltd., ApeosPort-V; C3375). The captured image was binarized using image analysis software (produced by Mitani Corporation, WinRoof2015; ver. 2.0), and the colored parts were taken to be parts in close adhesion with the substrate. The proportion of the area of the colored parts to the area of the test piece was calculated from the binarized image, and taken to be the close adhesion rate. The case where the close adhesion rate determined by image processing was 95% or more was evaluated as "excellent", the case where the close adhesion rate was 90% or more and less than 95% was evaluated as "good", and the case where the close adhesion rate was less than 90% was evaluated as "poor".

<Paste Residue>

Whether the foamed layer (adsorption layer) remained on the glass after the measurement of the weathering acceleration test (self-adsorbing power (after weathering acceleration)) due to cohesive fracture or interfacial peeling of the foamed layer was visually examined. The case where the foamed layer did not remain on the glass was evaluated as "good", the case where the foamed layer remained on the glass was evaluated as "poor".

<Air Release Property>

After the self-adsorbable foamed laminate sheet was produced, a test piece cut out into a size of 125 mm×25 mm was prepared. The adsorption surface of the test piece was stuck onto a glass sheet with a smooth surface. The test piece was pressure-bonded with a 2 kgf load roller from above. Whether air remained between the test piece and the glass was visually examined, through observation from the back side of the surface to which the test piece was stuck. The case where air did not remain was evaluated as "good", and the case where air remained was evaluated as "poor".

<Amount of Formaldehyde Emission>

After the self-adsorbable foamed sheet was produced and a separator film was stuck onto the surface of the foamed layer (adsorption layer), a test piece cut out into a size of 200 mm×200 mm was prepared. The test piece was put into a tedlar bag of 5 L in volume, and the bag was hermetically sealed. Air of 2 L was encapsulated in the bag, and the bag was left for 6 hr in a constant temperature oven set at 23° C. and 50% RH. After this, the concentration of formaldehyde in the bag was measured with a detector tube (produced by Gastec Corporation, No. 91L). The case where the formaldehyde concentration was 0.1 ppm or less was evaluated as "good", and the case where the formaldehyde concentration was more than 0.1 ppm was evaluated as "poor".

<Foamed Layer Density>

After the self-adsorbable foamed laminate sheet was produced, a test piece cut out into a size of 200 mm×200 mm was prepared. The weight (X) g of the cut test piece was precisely weighed, and the weight (Y) g of the substrate cut out into 200 mm×200 mm was precisely weighed. The thicknesses of the produced self-adsorbable foamed laminate sheet and the substrate were then measured using a thickness meter, and the thickness of the substrate was subtracted from the thickness of the self-adsorbable foamed laminate sheet to yield the thickness of the foamed layer (T) cm. Here, the thickness value was calculated by the average value when measuring five points. The foamed layer density of the self-adsorbable foamed laminate sheet was calculated by substituting the measured weights (X) g and (Y) g into the following formula:

$$\text{Foamed layer density}(g/cm^3)=((X)-(Y))/((T)\times 20\times 20).$$

Preparation of Copolymer Latex

Production Example 1

A monomer mixture containing 70 parts of n-butyl acrylate, 14 parts of methyl methacrylate, 14 parts of styrene, and 2 parts of itaconic acid and 0.4 parts of polyoxyethylenealkyl sodium sulfate (produced by Kao Corporation, LATEMUL E-118B) were mixed into 27.0 parts of deionized water and stirred, thus obtaining a monomer emulsion.

Next, separately from the above, a glass reactor vessel including a reflux condenser, a drip funnel, a thermometer, a nitrogen blow port, and a stirrer was prepared, and 43.0 parts of deionized water and 0.2 parts of polyoxyethylenealkyl sodium sulfate were put into the glass reactor vessel, and increased in temperature to 80° C. while stirring. In a state of maintaining 80° C., 0.3 parts of ammonium persulfate dissolved in 5.7 parts of deionized water was added. Following this, the foregoing monomer emulsion was gradually added over 4 hr. After the completion of the addition, stirring was further continued for 4 hr. Subsequently, the glass reactor vessel was cooled to end the reaction, and a latex was obtained. The polymerization conversion rate at the time was approximately 100% (98% or more) (the charging ratio being equivalent to the monomer unit ratio of the copolymer). The obtained latex was adjusted to pH of 5.0 in 5% ammonia water, and 2.5 parts of polyoxyethylene lauryl ether (produced by Kao Corporation, EMULGEN 120) was added and then condensed to obtain a copolymer latex (A) with a solid content concentration of 55%. The glass-transition temperature (Tg) of the copolymer contained in the copolymer latex (A) was measured −25° C. The SP value of the copolymer contained in the copolymer latex (A) was measured 9.6 $(cal/cm^3)^{1/2}$ using Hoy's group contribution method.

Production Example 2

A copolymer latex (B) was obtained in the same way as Production Example 1 except that, in Production Example 1, 70 parts of butyl acrylate were replaced with 62 parts of n-butyl acrylate and 14 parts of styrene were replaced with 22 parts of styrene. The glass-transition temperature (Tg) of the copolymer contained in the copolymer latex (B) was measured −17° C. The SP value of the copolymer contained in the copolymer latex (B) was measured 9.6 $(cal/cm^3)^{1/2}$ using Hoy's group contribution method.

Production Example 3

43 parts of styrene, 53 parts of butadiene, 1 part of methyl methacrylate, 2 parts of itaconic acid, 1 part of acrylamide, 0.2 parts of sodium alkylbenzene sulfonate, 0.4 parts of sodium hydrogen carbonate, and 40.0 parts of ion-exchange water were added into a pressure vessel equipped with a stirrer, and stirred to prepare a monomer emulsion.

Next, separately from the above, 40.0 parts of ion-exchange water and 10.0 parts in terms of solid content of a seed latex (a latex of polymer particles of 70 nm in particle diameter obtained by polymerizing 38 parts of styrene, 60 parts of 1,3-butadiene, and 2 parts of methacrylic acid) were added into a pressure-resistant reactor equipped with a stirrer, and increased in temperature to 70° C.

Following this, 1.0 part of potassium persulfate was added, and the monomer emulsion was continuously added to the reactor over 5 hr. the mixture was then reacted for 4 hr, to obtain a copolymer latex (C). The glass-transition temperature (Tg) of the copolymer contained in the copolymer latex (C) was measured −40° C. The SP value of the copolymer except the seed latex contained in the copolymer latex (C) was measured 9.0 $(cal/cm^3)^{1/2}$ using Hoy's group contribution method.

Production Example 4

A monomer mixture containing 69 parts of ethyl acrylate, 25 parts of butyl acrylate, 3 parts of acrylonitrile, 1 part of N-methylolacrylamide, 1 part of acrylamide, and 1 part of acrylic acid and 0.4 parts of polyoxyethylenealkyl sodium sulfate (produced by Kao Corporation, LATEMUL E-118B) were mixed into 27.0 parts of deionized water and stirred, thus obtaining a monomer emulsion.

Next, separately from the above, a glass reactor vessel including a reflux condenser, a drip funnel, a thermometer, a nitrogen blow port, and a stirrer was prepared, and 43.0 parts of deionized water and 0.2 parts of polyoxyethylenealkyl sodium sulfate were put into the glass reactor vessel, and increased in temperature to 70° C. while stirring. In a state of maintaining 70° C., 0.3 parts of ammonium persulfate dissolved in 5.7 parts of deionized water was added. Following this, the foregoing monomer emulsion was gradually added over 4 hr. After the completion of the addition, stirring was further continued for 4 hr. Subsequently, the glass reactor vessel was cooled to end the reaction, and a latex was obtained. A copolymer latex (D) was otherwise obtained in the same way as Production Example 1. The glass-transition temperature (Tg) of the copolymer contained in the copolymer latex (D) was measured −17° C. The SP value of the copolymer contained in the copolymer latex (D) was measured 9.9 $(cal/cm^3)^{1/2}$ using Hoy's group contribution method.

Production Example 5

A monomer mixture containing 61 parts of ethyl acrylate, 27 parts of butyl acrylate, 10 parts of acrylonitrile, and 2 parts of itaconic acid and 0.4 parts of polyoxyethylenealkyl sodium sulfate (produced by Kao Corporation, LATEMUL E-118B) were mixed into 27.0 parts of deionized water and stirred, thus obtaining a monomer emulsion. A copolymer latex (E) was otherwise obtained in the same way as Production Example 4. The glass-transition temperature (Tg) of the copolymer contained in the copolymer latex (E) was measured −21° C. The SP value of the copolymer contained in the copolymer latex (E) was measured 10.1 $(cal/cm^3)^{1/2}$ using Hoy's group contribution method.

Production Example 6

A monomer mixture containing 47 parts of ethyl acrylate, 46 parts of n-butyl acrylate, 6 parts of acrylonitrile, and 1 part of N-methylolacrylamide and 0.4 parts of polyoxyethylenealkyl sodium sulfate (produced by Kao Corporation, LATEMUL E-118B) were mixed into 27.0 parts of deionized water and stirred, thus obtaining a monomer emulsion. A copolymer latex (F) was otherwise obtained in the same way as Production Example 4. The glass-transition temperature (Tg) of the copolymer contained in the copolymer latex (F) was measured −26° C. The SP value of the copolymer contained in the copolymer latex (F) was measured 10.1 $(cal/cm^3)^{1/2}$ using Hoy's group contribution method.

Production Example 7

A copolymer latex (G) was obtained in the same way as Production Example 1 except that, in Production Example 1, 2 parts of itaconic acid were not used and 14 parts of methyl methacrylate were replaced with 16 parts of methyl methacrylate. The glass-transition temperature (Tg) of the copolymer contained in the copolymer latex (G) was measured −25° C. The SP value of the copolymer contained in the copolymer latex (G) was measured 9.5 $(cal/cm^3)^{1/2}$ using Hoy's group contribution method.

Example 1

Into a mixing vessel, 100 parts by mass of copolymer latex (A) produced in Production Example 1 (i.e. 100 parts by mass of the copolymer contained in the copolymer latex (A)) in terms of solid content, 3.6 parts by mass of a carbodiimide crosslinking agent (produced by DIC Corporation, DICNAL HX) in terms of solid content, and 4.2 parts by mass of a titanium oxide water dispersion (produced by DIC Corporation, DISPERSE WHITE HG-701) in terms of solid content were added, and stirred with a disperser. Next, while continuing stirring, 2 parts by mass of a thickener (carboxylic acid-modified acrylic acid ester polymers, produced by Toagosei Co., Ltd., ARON B-300K) in terms of solid content and 4.1 parts by mass of a foam stabilizer [a 1/1 mixture of: a mixture of amphoteric compounds of alkyl betaines and fatty acid alkanolamides (produced by DIC Corporation, DICNAL M-20)/sulfonic acid-type anionic surfactants (produced by DIC Corporation, DICNAL M-40)] in terms of solid content were added in this order, and filtered through 150 mesh. Lastly, ammonia was added to adjust the viscosity to 4,500 mPa·s, thus obtaining a composition for a self-adsorbable foamed sheet. The viscosity was measured using a B-type viscometer (produced by RION Co., Ltd., VISCOTESTER VT-06).

This composition for a self-adsorbable foamed sheet was stirred with a beater, to be whipped so that the foaming ratio was 1.6 times. Further, stirring was continued for 5 min at a lower stirring speed.

The obtained foamed composition for a self-adsorbable foamed sheet was applied onto a substrate (a polyethylene terephthalate film of 50 μm in thickness) using a 0.3 mm applicator. This was put into a drying oven, and held at 80° C. for 1.33 min, at 120° C. for 1.33 min, and at 140° C. for 1.33 min, to be subjected to dry crosslinking. A foamed layer (self-adsorbable foamed sheet) was stacked onto the substrate, and a self-adsorbable foamed laminate sheet according to Example 1 was obtained. The thickness of the foamed layer after the drying was 133 μm. The thickness of the foamed layer was measured by measuring the thickness of the substrate using a thickness meter and subtracting the thickness of the substrate from the thickness of the self-adsorbable foamed laminate sheet.

Example 2

A self-adsorbable foamed laminate sheet was obtained in the same way as Example 1 except that, in Example 1, the copolymer latex (B) produced in Production Example 2 was used instead of the copolymer latex (A) produced in Production Example 1, and each evaluation was performed. The evaluation results are listed in Table 1.

Example 3

A self-adsorbable foamed laminate sheet was obtained in the same way as Example 1 except that, in Example 1, the copolymer latex (C) produced in Production Example 3 was used instead of the copolymer latex (A) produced in Production Example 1, and each evaluation was performed. The evaluation results are listed in Table 1.

Comparative Example 1

A self-adsorbable foamed laminate sheet was obtained in the same way as Example 1 except that, in Example 1, the copolymer latex (D) produced in Production Example 4 was used instead of the copolymer latex (A) produced in Production Example 1, and each evaluation was performed. The evaluation results are listed in Table 1.

Comparative Example 2

A self-adsorbable foamed laminate sheet was obtained in the same way as Example 1 except that, in Example 1, the copolymer latex (E) produced in Production Example 5 was used instead of the copolymer latex (A) produced in Production Example 1, and each evaluation was performed. The evaluation results are listed in Table 1.

Comparative Example 3

A self-adsorbable foamed laminate sheet was obtained in the same way as Example 1 except that, in Example 1, the copolymer latex (F) produced in Production Example 6 was used instead of the copolymer latex (A) produced in Production Example 1, and each evaluation was performed. The evaluation results are listed in Table 1.

Comparative Example 4

A self-adsorbable foamed laminate sheet was obtained in the same way as Example 1 except that, in Example 1, the copolymer latex (G) produced in Production Example 7 was used instead of the copolymer latex (A) produced in Production Example 1, and each evaluation was performed. The evaluation results are listed in Table 1.

Comparative Example 5

A non-foamed sheet was obtained in the same way as Example 1 except that, in Example 1, the foaming operation that "the composition for a self-adsorbable foamed sheet was stirred with a beater to be whipped so that the foaming ratio was 1.6 times and further stirring was continued for 5 min at a lower stirring speed" was not performed, and each evaluation was performed. The evaluation results are listed in Table 1.

adsorbable foamed laminate sheet having excellent weather resistance was not obtained. In Comparative Examples 3 to 4 using a copolymer not containing an unsaturated carboxylic acid monomer unit, paste residue occurred. In Comparative Example 5 using a non-foamed sheet, the air release property decreased, and paste residue occurred.

TABLE 1

|  |  |  | Example 1 | Example 2 | Example 3 | Comparative Example 1 | Comparative Example 2 |
|---|---|---|---|---|---|---|---|
| Monomer from which monomer unit is derived | Styrene | parts by mass | 14 | 22 | 43 | — | — |
|  | Methyl methacrylate |  | 14 | 14 | 1 | — | — |
|  | Acrylonitrile |  | — | — | — | 3 | 10 |
|  | n-butyl acrylate |  | 70 | 62 | — | 25 | 27 |
|  | Ethyl acrylate |  | — | — | — | 69 | 61 |
|  | Butadiene |  | — | — | 53 | — | — |
|  | Itaconic acid |  | 2 | 2 | 2 | — | 2 |
|  | Acrylic acid |  | — | — | — | 1 | — |
|  | Acrylamide |  | — | — | 1 | 1 | — |
|  | N-methylol acrylamide |  | — | — | — | 1 | — |
| Physical property of copolymer contained in latex | SP value | $(cal/cm^3)^{0.5}$ | 9.6 | 9.6 | 9.0 | 9.9 | 10.1 |
|  | Tg | °C. | −25 | −17 | −40 | −17 | −21 |
| Physical property of composition | Viscosity | mPa·s | 4900 | 5200 | 4800 | 5000 | 5200 |
| Physical property of sheet | Foaming | — | Performed | Performed | Performed | Performed | Performed |
|  | Foamed layer thickness | μm | 133 | 138 | 150 | 143 | 164 |
|  | Foamed layer density | g/cm³ | 0.68 | 0.64 | 0.65 | 0.64 | 0.55 |
|  | Air release property | — | Good | Good | Good | Good | Good |
|  | Self-adsorbing power (glass) Initial value | N/cm | 1.4 | 1.3 | 1.6 | 0.1 | 0.5 |
|  | After weathering acceleration | N/cm | 2.8 | 3.0 | 3.5 | 4.0 | 3.9 |
|  | Close adhesion rate (after acceleration) | — | Excellent | Excellent | Excellent | Good | Good |
|  | Paste residue | — | Good | Good | Good | Poor | Good |
|  | Amount of formaldehyde emission (Good: 0.1 ppm or less) | — | Good | Good | Good | Poor | Good |

|  |  |  | Comparative Example 3 | Comparative Example 4 | Comparative Example 5 |
|---|---|---|---|---|---|
| Monomer from which monomer unit is derived | Styrene | parts by mass | — | 14 | 14 |
|  | Methyl methacrylate |  | — | 16 | 14 |
|  | Acrylonitrile |  | 6 | — | — |
|  | n-butyl acrylate |  | 46 | 70 | 70 |
|  | Ethyl acrylate |  | 47 | — | — |
|  | Butadiene |  | — | — | — |
|  | Itaconic acid |  | — | — | 2 |
|  | Acrylic acid |  | — | — | — |
|  | Acrylamide |  | — | — | — |
|  | N-methylol acrylamide |  | 1 | — | — |
| Physical property of copolymer contained in latex | SP value | $(cal/cm^3)^{0.5}$ | 10.1 | 9.5 | 9.6 |
|  | Tg | °C. | −26 | −25 | −25 |
| Physical property of composition | Viscosity | mPa·s | 5100 | 4900 | 4900 |
| Physical property of sheet | Foaming | — | Performed | Performed | Not performed |
|  | Foamed layer thickness | μm | 152 | 160 | 130 |
|  | Foamed layer density | g/cm³ | 0.52 | 0.66 | 1.12 |
|  | Air release property | — | Good | Good | Poor |
|  | Self-adsorbing power (glass) Initial value | N/cm | 0.2 | 1.5 | 2.5 |
|  | After weathering acceleration | N/cm | 5.4 | 3.0 | 5.5 |
|  | Close adhesion rate (after acceleration) | — | Poor | Excellent | Excellent |
|  | Paste residue | — | Poor | Poor | Poor |
|  | Amount of formaldehyde emission (Good: 0.1 ppm or less) | — | Poor | Good | Good |

As indicated in Table 1, in Examples 1 to 3, a self-adsorbable foamed laminate sheet having excellent weather resistance and causing no paste residue was obtained.

In Comparative Examples 1 to 3 using a copolymer with a high SP value, the close adhesion rate after the weathering acceleration treatment decreased, and consequently a self-

INDUSTRIAL APPLICABILITY

It is therefore possible to obtain a self-adsorbable foamed laminate sheet having excellent weather resistance and causing no paste residue.

REFERENCE SIGNS LIST

S1 composition production step
S2 foaming step
S3 sheet forming step

The invention claimed is:

1. A self-adsorbable foamed sheet obtained by foaming and crosslinking a composition comprising: a copolymer containing an unsaturated carboxylic acid monomer unit and having a solubility parameter (SP value) of 9.7 $(cal/cm^3)^{1/2}$ or less and a glass-transition temperature of $-10°$ C. or less; and
   a crosslinking agent, wherein the crosslinking agent is a carbodiimide crosslinking agent, a content of the crosslinking agent with respect to 100 parts by mass of the copolymer is 1 part by mass or more and 20 parts by mass or less,
   the copolymer further contains an alkenyl aromatic monomer unit, a conjugated diene monomer unit, and a (meth)acrylate monomer unit,
   a content of the alkenyl aromatic monomer unit based on 100 mass % of the copolymer is 1 mass % or more and 5 mass % or less,
   a content of the conjugated diene monomer unit based on 100 mass % of the copolymer is 56 mass % or more and 70 mass % or less,
   a content of the unsaturated carboxylic acid monomer unit based on 100 mass % of the copolymer is 0.1 mass % or more and 2.5 mass % or less,
   a content of the (meth)acrylate monomer unit based on 100 mass % of the copolymer is 40 mass % or more.

2. The self-adsorbable foamed sheet according to claim 1, wherein the (meth)acrylate monomer unit is a (meth)acrylic acid alkyl ester monomer unit whose alkyl group has a carbon number of 1 or more and 14 or less.

3. The self-adsorbable foamed sheet according to claim 1, wherein the composition has a viscosity of 1000 mPa·s or more and 10000 mPa·s or less.

4. A self-adsorbable foamed laminate sheet comprising:
   a foamed layer composed of the self-adsorbable foamed sheet according to claim 1; and
   a support layer composed of a substrate.

5. The self-adsorbable foamed laminate sheet according to claim 4, wherein a density of the foamed layer is 0.1 $g/cm^3$ or more and 1.0 $g/cm^3$ or less.

6. The self-adsorbable foamed laminate sheet according to claim 4, wherein a thickness of the foamed layer is 0.03 mm or more and 3 mm or less.

* * * * *